US009723129B2

(12) United States Patent
Wang et al.

(10) Patent No.: US 9,723,129 B2
(45) Date of Patent: Aug. 1, 2017

(54) VOICE CALL ESTABLISHING METHOD AND APPARATUS

(71) Applicant: Huawei Device Co., Ltd., Shenzhen (CN)

(72) Inventors: Lei Wang, Beijing (CN); Jian Yang, Beijing (CN); Jilin Li, Shenzhen (CN); Yongfeng Tu, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 15/035,197

(22) PCT Filed: Nov. 7, 2014

(86) PCT No.: PCT/CN2014/090537
§ 371 (c)(1),
(2) Date: May 6, 2016

(87) PCT Pub. No.: WO2015/067203
PCT Pub. Date: May 14, 2015

(65) Prior Publication Data
US 2016/0286031 A1    Sep. 29, 2016

(30) Foreign Application Priority Data

Nov. 7, 2013  (CN) .......................... 2013 1 0549551

(51) Int. Cl.
*H04M 1/725*    (2006.01)
*H04W 76/02*    (2009.01)

(52) U.S. Cl.
CPC ....... *H04M 1/72569* (2013.01); *H04W 76/02* (2013.01)

(58) Field of Classification Search
CPC ...... H04M 1/725; H04M 1/247; H04W 76/02
(Continued)

(56) References Cited

U.S. PATENT DOCUMENTS 7,006,819 B2 *  2/2006  Mazzara ............. H04M 1/6083
                                                                455/418
7,599,690 B2 * 10/2009  Kamdar ............. H04M 3/42357
                                                                455/404.1
(Continued)

FOREIGN PATENT DOCUMENTS

CN        101212732 A      7/2008
CN        101610307 A     12/2009
(Continued)

*Primary Examiner* — Cong Tran

(57) ABSTRACT

The present invention relates to a voice call establishing method and apparatus. The method includes: receiving a voice call request, and generating an internal trigger signal according to the voice call request; detecting an acceleration characteristic value of a mobile terminal and/or a characteristic value of a distance from the mobile terminal to a target object within a preset time threshold; and if an initial value of the acceleration characteristic value is a first characteristic value and does not change within the preset time threshold, establishing a first voice call; and if the acceleration characteristic value changes from the first characteristic value to a second characteristic value within the preset time threshold, and the characteristic value of the distance changes from a first distance characteristic value to a second distance characteristic value, establishing a second voice call.

20 Claims, 6 Drawing Sheets

(58) Field of Classification Search
USPC ............ 455/414.1, 414.2, 414.3, 427, 404.2, 455/566.1, 563, 564
See application file for complete search history.

(56) References Cited

U.S. PATENT DOCUMENTS

| | | | |
|---|---|---|---|
| 2009/0312068 A1 | 12/2009 | Kuo | |
| 2011/0263241 A1 | 10/2011 | Duarte et al. | |
| 2012/0278074 A1* | 11/2012 | Burke | G06F 3/0346 704/235 |
| 2013/0190043 A1* | 7/2013 | Kulas | G06F 3/041 455/556.1 |
| 2014/0122090 A1* | 5/2014 | Park | G06F 3/167 704/275 |
| 2014/0274211 A1* | 9/2014 | Sejnoha | H04M 1/72519 455/563 |
| 2015/0056973 A1* | 2/2015 | Efrati | H04W 76/064 455/418 |

FOREIGN PATENT DOCUMENTS

| | | |
|---|---|---|
| CN | 101754462 A | 6/2010 |
| CN | 101964844 A | 2/2011 |
| CN | 102724364 A | 10/2012 |
| CN | 102845127 A | 12/2012 |
| CN | 103369147 A | 10/2013 |

\* cited by examiner

VOICE CALL ESTABLISHING METHOD AND APPARATUS

CROSS-REFERENCE TO RELATED APPLICATIONS

The present application claims priority under 35 U.S.C. §365 to International Patent Application No. PCT/CN2014/090537 filed Nov. 7, 2014. International Patent Application No. PCT/CN2014/090537 claims priority under 35 U.S.C. §365 and/or 35 U.S.C. §119 to Chinese Patent Application No. 201310549551.9 filed Nov. 7, 2013 and which are incorporated herein by reference into the present disclosure as if fully set forth herein.

TECHNICAL FIELD

The present invention relates to the field of mobile communications technologies, and in particular, to a voice call establishing method and apparatus.

BACKGROUND

With the rapid development of mobile communications and terminal technologies, a mobile terminal is increasingly widely applied. As the mobile terminal develops rapidly, some drawbacks occur in some applications. For example, if a user needs to make a voice call when driving a car, security of the user is affected. To resolve this problem, an increasingly large quantity of vehicles are equipped with an in-vehicle device, such as in-vehicle Bluetooth.

In the prior art, when a user carries a mobile terminal into a car, based on pre-configured information, the mobile terminal may be connected to the car by using in-vehicle Bluetooth; when the mobile terminal receives a voice call and establishes a voice call, voice information may be transmitted to an in-vehicle device and broadcast by using a voice-output device (for example, a speaker or a sound) of the car, and a voice-input device (for example, a microphone) of the car may also receive the voice information of the user and transmit the voice information to the mobile terminal by using the in-vehicle device, so as to implement the voice call. Because an environment of a same car may change, for example, the car is usually taken by a family member, according to the pre-configured information, it is more convenient to complete a voice call by using an voice input/output device of the car; however, if the car is taken by a colleague or a neighbor sometime, completing a voice call by using the voice input/output device of the car may cause leakage of user privacy and further reduce a user experience effect.

SUMMARY

Embodiments of the present invention provide a voice call establishing method and apparatus, which can implement quick establishment or termination processing of a voice call on a mobile terminal in an in-vehicle environment or switch processing between voice calls of different types, and improve efficiency and convenience of establishing a voice call.

According to a first aspect, the present invention provides a voice call establishing method, and the method includes:

receiving a voice call request, and generating an internal trigger signal according to the voice call request;

detecting an acceleration characteristic value of a mobile terminal and/or a characteristic value of a distance from the mobile terminal to a target object within a preset time threshold according to the internal trigger signal; and if an initial value of the acceleration characteristic value of the mobile terminal is a first characteristic value and does not change within the preset time threshold, generating a first determining signal, and according to the first determining signal, receiving the voice call request and establishing a first voice call, where audio information of the first voice call is input or output by using an audio input/output device of a car connected to the mobile terminal; and if the acceleration characteristic value of the mobile terminal changes from the initial first characteristic value to a second characteristic value within the preset time threshold, and the characteristic value of the distance from the mobile terminal to the target object changes from a first distance characteristic value to a second distance characteristic value, generating a second determining signal, and establishing a second voice call according to the second determining signal, where audio information of the second voice call is input or output by using an audio input/output device of the mobile terminal.

In a first possible implementation manner, if the acceleration characteristic value of the mobile terminal changes from the initial first characteristic value to a third characteristic value within the preset time threshold, a third determining signal is generated, the voice call request is denied according to the third determining signal, and a voice call is terminated according to the third determining signal.

With reference to the first possible implementation manner of the first aspect, in a second possible implementation manner, after the detecting an acceleration characteristic value of a mobile terminal and/or a characteristic value of a distance from the mobile terminal to a target object within a preset time threshold according to the internal trigger signal, the method further includes: if the initial value of the acceleration characteristic value of the mobile terminal is the third characteristic value and does not change within the preset time threshold, generating the third determining signal, and according to the third determining signal, denying the voice call request and ending a voice call.

With reference to the first aspect or the first and the second possible implementation manners of the first aspect, in a third possible implementation manner, after the detecting an acceleration characteristic value of a mobile terminal and/or a characteristic value of a distance from the mobile terminal to a target object within a preset time threshold according to the internal trigger signal, the method further includes: if the initial value of the acceleration characteristic value of the mobile terminal is the third characteristic value and the acceleration characteristic value changes from the initial third characteristic value to the first characteristic value within the preset time threshold, generating the first determining signal, and according to the first determining signal, receiving the voice call request and establishing the first voice call.

With reference to the first aspect or the first, the second, and the third possible implementation manners of the first aspect, in a fourth possible implementation manner, after the detecting an acceleration characteristic value of a mobile terminal and/or a characteristic value of a distance from the mobile terminal to a target object within a preset time threshold according to the internal trigger signal, the method further includes: if the initial value of the acceleration characteristic value of the mobile terminal is the third characteristic value and the acceleration characteristic value changes from the initial third characteristic value to the second characteristic value within the preset time threshold, and the characteristic value of the distance from the mobile terminal to the target object changes from the first distance characteristic value to the second distance characteristic value, generating the second determining signal, and establishing the second voice call according to the second determining signal.

With reference to the first aspect or the first, the second, the third, and the fourth possible implementation manners of the first aspect, in a fifth possible implementation manner, after the establishing a first voice call, the method further includes: detecting the acceleration characteristic value of the mobile terminal; and if the acceleration characteristic value of the mobile terminal changes from the first characteristic value to the third characteristic value, generating a fourth determining signal, and terminating the voice call according to the fourth determining signal.

With reference to the first aspect or the first, the second, the third, the fourth, and the fifth possible implementation manners of the first aspect, in a sixth possible implementation manner, after the establishing a first voice call, the method further includes: detecting the characteristic value of the distance from the mobile terminal to the target object and the acceleration characteristic value of the mobile terminal; and if the characteristic value of the distance from the mobile terminal to the target object changes from the first distance characteristic value to the second distance characteristic value, and the acceleration characteristic value of the mobile terminal changes from the first characteristic value to the second characteristic value, generating a fifth determining signal, and converting the first voice call into the second voice call according to the fifth determining signal.

With reference to the first aspect or the first, the second, the third, the fourth, the fifth, and the sixth possible implementation manners of the first aspect, in a seventh possible implementation manner, after the establishing a second voice call, the method further includes: detecting the acceleration characteristic value of the mobile terminal; and if the acceleration characteristic value of the mobile terminal changes from the second characteristic value to the third characteristic value, generating a sixth determining signal, and terminating the voice call according to the sixth determining signal.

With reference to the first aspect or the first, the second, the third, the fourth, the fifth, the sixth, and the seventh possible implementation manners of the first aspect, in an eighth possible implementation manner, after the establishing a second voice call, the method further includes: detecting the characteristic value of the distance from the mobile terminal to the target object and the acceleration characteristic value of the mobile terminal; and if the characteristic value of the distance from the mobile terminal to the target object changes from the second distance characteristic value to the first distance characteristic value, and the acceleration characteristic value of the mobile terminal changes from the second characteristic value to the first characteristic value, generating a seventh determining signal, and converting the second voice call into the first voice call according to the seventh determining signal.

According to a second aspect, an embodiment of the present invention provides a voice call establishing method, and the method includes:

receiving a voice call request, and generating an internal trigger signal according to the voice call request;

detecting an acceleration characteristic value of a mobile terminal and/or a characteristic value of a distance from the mobile terminal to a target object within a preset time threshold according to the internal trigger signal; and if an initial value of the acceleration characteristic value of the mobile terminal is a third characteristic value and the acceleration characteristic value changes from the initial third characteristic value to the first characteristic value within the preset time threshold, generating the first determining signal, and according to the first determining signal, receiving the voice call request and establishing a first voice call, where audio information of the first voice call is input or output by using an audio input/output device of a car connected to the mobile terminal; and if the acceleration characteristic value of the mobile terminal changes from the third characteristic value to a second characteristic value within the preset time threshold, and the characteristic value of the distance from the mobile terminal to the target object changes from a first distance characteristic value to a second distance characteristic value, generating the second determining signal, and establishing a second voice call according to the second determining signal, where audio information of the second voice call is input or output by using an audio input/output device of the mobile terminal.

In a first possible implementation manner, after the detecting an acceleration characteristic value of a mobile terminal and/or a characteristic value of a distance from the mobile terminal to a target object within a preset time threshold according to the internal trigger signal, the method further includes: if the initial value of the acceleration characteristic value of the mobile terminal is the third characteristic value and does not change within the preset time threshold, generating the third determining signal, and according to the third determining signal, denying the voice call request and ending a voice call.

With reference to the first possible implementation manner of the second aspect, in a second possible implementation manner, after the detecting an acceleration characteristic value of a mobile terminal and/or a characteristic value of a distance from the mobile terminal to a target object within a preset time threshold according to the internal trigger signal, the method further includes: if the initial value of the acceleration characteristic value of the mobile terminal is the first characteristic value and changes from the first characteristic value to the third characteristic value within the preset time threshold, generating the third determining signal, and according to the third determining signal, denying the voice call request and terminating a voice call.

With reference to the second aspect or the first and the second possible implementation manners of the second aspect, in a third possible implementation manner, after the detecting an acceleration characteristic value of a mobile terminal and/or a characteristic value of a distance from the mobile terminal to a target object within a preset time threshold according to the internal trigger signal, the method further includes: if the initial value of the acceleration characteristic value of the mobile terminal is the first characteristic value and does not change within the preset time threshold, generating the first determining signal, and according to the first determining signal, receiving the voice call request and establishing the first voice call.

With reference to the second aspect or the first, the second, and the third possible implementation manners of the second aspect, in a fourth possible implementation manner, after the detecting an acceleration characteristic value of a mobile terminal and/or a characteristic value of a distance from the mobile terminal to a target object within a preset time threshold according to the internal trigger signal, the method further includes: if the initial value of the acceleration characteristic value of the mobile terminal is the first characteristic value and changes from the first characteristic value to the second characteristic value within the preset time threshold, and the characteristic value of the distance from the mobile terminal to the target object changes from the first distance characteristic value to the second distance characteristic value, generating the second determining signal, and establishing the second voice call according to the second determining signal.

With reference to the second aspect or the first, the second, the third, and the fourth possible implementation manners of the second aspect, in a fifth possible implementation manner, after the establishing a first voice call, the method further includes: detecting the acceleration characteristic value of the mobile terminal; and if the acceleration characteristic value of the mobile terminal changes from the first characteristic value to the third characteristic value, generating a fourth determining signal, and terminating the voice call according to the fourth determining signal.

With reference to the second aspect and the first, the second, the third, the fourth, or the fifth possible implementation manners of the second aspect, in a sixth possible implementation manner, after the establishing a first voice call, the method further includes: detecting the characteristic value of the distance from the mobile terminal to the target object and the acceleration characteristic value of the mobile terminal; and if the characteristic value of the distance from the mobile terminal to the target object changes from the first distance characteristic value to the second distance characteristic value, and the acceleration characteristic value of the mobile terminal changes from the first characteristic value to the second characteristic value, generating a fifth determining signal, and converting the first voice call into the second voice call according to the fifth determining signal.

With reference to the second aspect and the first, the second, the third, the fourth, the fifth, or the sixth possible implementation manners of the second aspect, in a seventh possible implementation manner, after the establishing a second voice call, the method further includes: detecting the acceleration characteristic value of the mobile terminal; and if the acceleration characteristic value of the mobile terminal changes from the second characteristic value to the third characteristic value, generating a sixth determining signal, and terminating the voice call according to the sixth determining signal.

With reference to the second aspect or the first, the second, the third, the fourth, the fifth, the sixth, and the seventh possible implementation manners of the second aspect, in an eighth possible implementation manner, after the establishing a second voice call, the method further includes: detecting the characteristic value of the distance from the mobile terminal to the target object and the acceleration characteristic value of the mobile terminal; and if the characteristic value of the distance from the mobile terminal to the target object changes from the second distance characteristic value to the first distance characteristic value, and the acceleration characteristic value of the mobile terminal changes from the second characteristic value to the first characteristic value, generating a seventh determining signal, and converting the second voice call into the first voice call according to the seventh determining signal.

According to a third aspect, an embodiment of the present invention provides a voice call establishing apparatus, and the apparatus includes:

a receiving unit, configured to receive a voice call request, generate an internal trigger signal according to the voice call request, and transmit the internal trigger signal to a detecting unit;

the detecting unit, configured to receive the internal trigger signal, detect an acceleration characteristic value of a mobile terminal and/or a characteristic value of a distance from the mobile terminal to a target object within a preset time threshold according to the internal trigger signal, and transmit, to a call establishing unit, the acceleration characteristic value of the mobile terminal and the characteristic value of the distance from the mobile terminal to the target object; and the call establishing unit, configured to receive the acceleration characteristic value of the mobile terminal and the characteristic value of the distance from the mobile terminal to the target object; and if an initial value of the acceleration characteristic value of the mobile terminal is a first characteristic value and does not change within the preset time threshold, generate a first determining signal, and according to the first determining signal, receive the voice call request and establish a first voice call, where audio information of the first voice call is input or output by using an audio input/output device of a car connected to the mobile terminal; and if the acceleration characteristic value of the mobile terminal changes from the initial first characteristic value to a second characteristic value within the preset time threshold, and the characteristic value of the distance from the mobile terminal to the target object changes from a first distance characteristic value to a second distance characteristic value, generate a second determining signal, and establish a second voice call according to the second determining signal, where audio information of the second voice call is input or output by using an audio input/output device of the mobile terminal.

In a first possible implementation manner, the apparatus further includes a call ending unit, and the call ending unit is configured to receive the acceleration characteristic value of the mobile terminal transmitted by the detecting unit; and if the acceleration characteristic value of the mobile terminal changes from the initial first characteristic value to a third characteristic value within the preset time threshold, generate a third determining signal, and according to the third determining signal, deny the voice call request and terminate a voice call.

With reference to the first possible implementation manner of the third aspect, in a second possible implementation manner, the call ending unit is further configured to: if the initial value of the acceleration characteristic value of the mobile terminal is the third characteristic value and does not change within the preset time threshold, generate the third determining signal, and according to the third determining signal, deny the voice call request and end a voice call.

With reference to the third aspect or the first and the second possible implementation manners of the third aspect, in a third possible implementation manner, the call establishing unit is further configured to: if the initial value of the acceleration characteristic value of the mobile terminal is the third characteristic value and the acceleration characteristic value changes from the initial third characteristic value to the first characteristic value within the preset time threshold, generate the first determining signal, and according to the first determining signal, receive the voice call request and establish the first voice call.

With reference to the third aspect or the first, the second, and the third possible implementation manners of the third aspect, in a fourth possible implementation manner, the call establishing unit is further configured to: if the initial value of the acceleration characteristic value of the mobile terminal is the third characteristic value and the acceleration characteristic value changes from the initial third characteristic value to the second characteristic value within the preset time threshold, and the characteristic value of the distance from the mobile terminal to the target object changes from the first distance characteristic value to the second distance characteristic value, generate the second determining signal, and establish the second voice call according to the second determining signal.

With reference to the third aspect or the first, the second, the third, and the fourth possible implementation manners of the third aspect, in a fifth possible implementation manner, the call ending unit is further configured to receive the acceleration characteristic value that is of the mobile terminal and detected by the detecting unit; and if the acceleration characteristic value of the mobile terminal changes from the first characteristic value to the third characteristic value, generate a fourth determining signal, and terminate a voice call according to the fourth determining signal.

With reference to the third aspect or the first, the second, the third, the fourth, and the fifth possible implementation manners of the third aspect, in a sixth possible implementation manner, the apparatus further includes a call switching unit, and the call switching unit is configured to receive the characteristic value of the distance from the mobile terminal to the target object and the acceleration characteristic value of the mobile terminal that are detected by the detecting unit; and if the characteristic value of the distance from the mobile terminal to the target object changes from the first distance characteristic value to the second distance characteristic value, and the acceleration characteristic value of the mobile terminal changes from the first characteristic value to the second characteristic value, generate a fifth determining signal, and convert the first voice call into the second voice call according to the fifth determining signal.

With reference to the first possible implementation manner of the third aspect, in a seventh possible implementation manner, the call ending unit is further configured to receive the acceleration characteristic value that is of the mobile terminal and detected by the detecting unit; and if the acceleration characteristic value of the mobile terminal changes from the second characteristic value to the third characteristic value, generate a sixth determining signal, and terminate a voice call according to the sixth determining signal.

With reference to the sixth possible implementation manner of the third aspect, in an eighth possible implementation manner, the call switching unit is further configured to receive the characteristic value of the distance from the mobile terminal to the target object and the acceleration characteristic value of the mobile terminal that are detected by the detecting unit; and if the characteristic value of the distance from the mobile terminal to the target object changes from the second distance characteristic value to the first distance characteristic value, and the acceleration characteristic value of the mobile terminal changes from the second characteristic value to the first characteristic value, generate a seventh determining signal, and convert the second voice call into the first voice call according to the seventh determining signal.

According to a fourth aspect, an embodiment of the present invention provides a voice call establishing apparatus, and the apparatus includes:

a receiving unit, configured to receive a voice call request, generate an internal trigger signal according to the voice call request, and transmit the internal trigger signal to a detecting unit;

the detecting unit, configured to detect an acceleration characteristic value of a mobile terminal and/or a characteristic value of a distance from the mobile terminal to a target object within a preset time threshold according to the internal trigger signal, and transmit, to a call establishing unit, the acceleration characteristic value of the mobile terminal and the characteristic value of the distance from the mobile terminal to the target object; and the call establishing unit, configured to receive the acceleration characteristic value of the mobile terminal and the characteristic value of the distance from the mobile terminal to the target object; and if an initial value of the acceleration characteristic value of the mobile terminal is a third characteristic value and the acceleration characteristic value changes from the initial third characteristic value to the first characteristic value within the preset time threshold, generate the first determining signal, and according to the first determining signal, receive the voice call request and establish a first voice call, where audio information of the first voice call is input or output by using an audio input/output device of a car connected to the mobile terminal; and if the acceleration characteristic value of the mobile terminal changes from the third characteristic value to a second characteristic value within the preset time threshold, and the characteristic value of the distance from the mobile terminal to the target object changes from a first distance characteristic value to a second distance characteristic value, generate the second determining signal, and establish a second voice call according to the second determining signal, where audio information of the second voice call is input or output by using an audio input/output device of the mobile terminal.

In a first possible implementation manner, the apparatus further includes a call ending unit, and the call ending unit is configured to: if the initial value of the acceleration characteristic value of the mobile terminal is the third characteristic value and does not change within the preset time threshold, generate the third determining signal, and according to the third determining signal, deny the voice call request and end a voice call.

With reference to the first possible implementation manner of the fourth aspect, in a second possible implementation manner, the call ending unit is further configured to: if the initial value of the acceleration characteristic value of the mobile terminal is the first characteristic value and changes from the first characteristic value to the third characteristic value within the preset time threshold, generate the third determining signal, and according to the third determining signal, deny the voice call request and terminate a voice call.

With reference to the fourth aspect or the first and the second possible implementation manners of the fourth aspect, in a third possible implementation manner, the call establishing unit is further configured to: if the initial value of the acceleration characteristic value of the mobile terminal is the first characteristic value and does not change within the preset time threshold, generate the first determining signal, and according to the first determining signal, receive the voice call request and establish the first voice call.

With reference to the fourth aspect or the first, the second, and the third possible implementation manners of the fourth aspect, in a fourth possible implementation manner, the call establishing unit is further configured to: if the initial value of the acceleration characteristic value of the mobile terminal is the first characteristic value and changes from the first characteristic value to the second characteristic value within the preset time threshold, and the characteristic value of the distance from the mobile terminal to the target object changes from the first distance characteristic value to the second distance characteristic value, generate the second determining signal, and establish the second voice call according to the second determining signal.

With reference to the fourth aspect or the first, the second, the third, and the fourth possible implementation manners of the fourth aspect, in a fifth possible implementation manner, the call ending unit is further configured to receive the acceleration characteristic value that is of the mobile terminal and detected by the detecting unit; and if the acceleration characteristic value of the mobile terminal changes from the first characteristic value to the third characteristic value, generate a fourth determining signal, and terminate a voice call according to the fourth determining signal.

With reference to the fourth aspect or the first, the second, the third, the fourth, and the fifth possible implementation manners of the fourth aspect, in a sixth possible implementation manner, the apparatus further includes a call switching unit, and the call switching unit is configured to receive the characteristic value of the distance from the mobile terminal to the target object and the acceleration characteristic value of the mobile terminal that are detected by the detecting unit; and if the characteristic value of the distance from the mobile terminal to the target object changes from the first distance characteristic value to the second distance characteristic value, and the acceleration characteristic value of the mobile terminal changes from the first characteristic value to the second characteristic value, generate a fifth determining signal, and convert the first voice call into the second voice call according to the fifth determining signal.

With reference to the first possible implementation manner of the fourth aspect, in a seventh possible implementation manner, the call ending unit is further configured to detect the acceleration characteristic value of the mobile terminal; and if the acceleration characteristic value of the mobile terminal changes from the second characteristic value to the third characteristic value, generate a sixth determining signal, and terminate a voice call according to the sixth determining signal.

With reference to the sixth possible implementation manner of the fourth aspect, in an eighth possible implementation manner, the call switching unit is further configured to receive the characteristic value of the distance from the mobile terminal to the target object and the acceleration characteristic value of the mobile terminal that are detected by the detecting unit; and if the characteristic value of the distance from the mobile terminal to the target object changes from the second distance characteristic value to the first distance characteristic value, and the acceleration characteristic value of the mobile terminal changes from the second characteristic value to the first characteristic value, generate a seventh determining signal, and convert the second voice call into the first voice call according to the seventh determining signal.

According to the voice call establishing method and apparatus provided in the embodiments of the present invention, when a voice call request is received, an acceleration characteristic value of a mobile terminal and a characteristic value of a distance from the mobile terminal to a target object are detected, and whether to establish voice calls of different types or to deny a voice call may be determined according to a change of the acceleration characteristic value and a change of the characteristic value of the distance from the mobile terminal to the target object. A type of a voice call may be a first voice call, that is, a voice call whose audio information is input or output by using an audio input/output device of a car connected to the mobile terminal, or may be a second voice call, that is, a voice call whose audio information is input or output by using an audio input/output device of the mobile terminal; in this way, in the embodiments of the present invention, establishment or termination processing of a voice call on a mobile terminal in an in-vehicle environment or switch processing between voice calls of different types is implemented, which improves efficiency and convenience of establishing a voice call.

DETAILED DESCRIPTION

The technical solutions of the present invention are further described in detail with reference to accompanying drawings and embodiments in the following.

In an actual application of a voice call establishing method provided in the embodiments of the present invention, the method serves as a new call establishing method and may be applied to a scenario in which a voice call request is received in an in-vehicle environment. In the in-vehicle environment, when a mobile terminal receives a voice call request from a calling terminal, an acceleration sensor and a proximity sensor that are built in the mobile terminal detect a movement characteristic of the terminal and voice calls of different types are established or terminated. A type of a voice call includes a voice call whose audio information is input or output by using an audio input/output device of a car connected to the mobile terminal, and a voice call whose audio information is input or output by using an audio input/output device of the mobile terminal. In this way, quick establishment or termination processing of a voice call on the mobile terminal in the in-vehicle environment or switch processing between the voice calls of different types is implemented, which improves efficiency and convenience of establishing a voice call.

Figure 1:
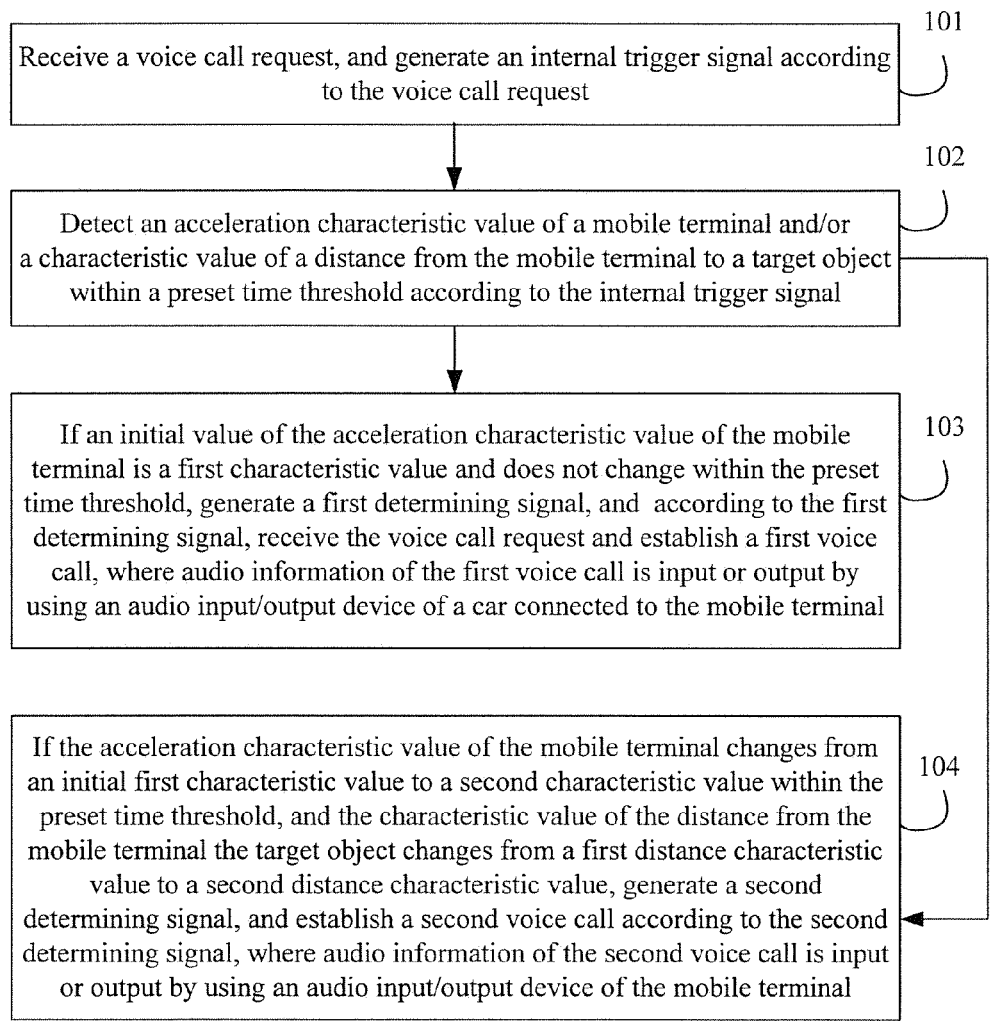
FIG. 1 is a flowchart of a voice call establishing method according to an embodiment of the present invention.

FIG. 1 is a flowchart of a voice call establishing method according to an embodiment of the present invention. This embodiment is executed by a mobile terminal, and in this embodiment, a process of receiving a voice call request and establishing a voice call by the mobile terminal is described in detail. As shown in the figure, this embodiment includes the following operating steps:

Step 101: Receive a voice call request, and generate an internal trigger signal according to the voice call request.

After receiving the voice call request, the mobile terminal may generate a radio frequency signal according to the voice call request, and after the radio frequency signal is sent to a processor, the processor may generate the internal trigger signal according to the radio frequency signal.

Step 102: Detect an acceleration characteristic value of the mobile terminal and/or a characteristic value of a distance from the mobile terminal to a target object within a preset time threshold according to the internal trigger signal.

Sensors such as an acceleration sensor, a proximity sensor, and a gyro sensor are built in the mobile terminal; when the processor generates the internal trigger signal, the acceleration sensor may detect, within the preset time threshold after the internal trigger signal is generated, acceleration characteristic values of the mobile terminal in three directions of an X-axis, a Y-axis, and a Z-axis, and in this way, a movement characteristic value of the mobile terminal may be detected.

Preferably, within the preset time threshold after the processor generates the internal trigger signal, the proximity sensor of the mobile terminal may detect distances from characteristic values of angles between the mobile terminal and a horizontal plane in the X-axis, the Y-axis, and the Z-axis directions to the target object, that is, a human ear; in this way, whether the mobile terminal is distant from the human ear or is close to the human ear may be determined.

Optionally, the mobile terminal may automatically set a time threshold for a voice call request of a user, or the user may actively set a time threshold; after the processor generates the internal trigger signal, the acceleration sensor may detect the acceleration characteristic value of the mobile terminal within the time threshold, and the proximity sensor detects the distance characteristic value of the distance between the mobile terminal and the target object within the preset time threshold.

Step 103: If an initial value of the acceleration characteristic value of the mobile terminal is a first characteristic value and does not change within the preset time threshold, generate a first determining signal, and according to the first determining signal, receive the voice call request and establish a first voice call, where audio information of the first voice call is input or output by using an audio input/output device of a car connected to the mobile terminal.

The first characteristic value may be 0 m/s$^2$ in an x-axis direction, 0 m/s$^2$ in a y-axis direction, and 9.81 m/s$^2$ in a z-axis direction, that is, a screen of the mobile terminal is placed upwards and horizontally; if the mobile terminal is placed upwards and horizontally when receiving the voice call request and does not change within the preset time threshold, the first determining signal is generated and the first voice call is established. The first voice call refers to a voice call whose audio information in a voice call process is input or output by using the audio input/output device of the car.

It should be noted that, a value of the first characteristic value may be specifically set by the user for the mobile terminal; the present application document provides description by using the first characteristic value as a corresponding acceleration characteristic value detected when the screen of the mobile terminal is placed upwards and horizontally; however, the first characteristic value may also be another characteristic value set by the user, and this embodiment of the present invention sets no limitation on a specific value of the first characteristic value.

Step 104: If the acceleration characteristic value of the mobile terminal changes from the initial first characteristic value to a second characteristic value within the preset time threshold, and the characteristic value of the distance from the mobile terminal to the target object changes from a first distance characteristic value to a second distance characteristic value, generate a second determining signal, and establish a second voice call according to the second determining signal, where audio information of the second voice call is input or output by using an audio input/output device of the mobile terminal.

If the acceleration sensor of the mobile terminal detects that the acceleration characteristic value changes from the first characteristic value to the second characteristic value, that is, placing the screen upwards and horizontally changes to placing the screen non-horizontally, and the proximity sensor detects that the characteristic value of the distance between the mobile terminal and the target object (where the target object may be a human ear) changes from the first distance characteristic value to the second distance characteristic value, the second voice call is established, where the second voice call refers to a voice call whose audio information in a voice call process is input or output by using the audio input/output device of the mobile terminal itself.

The first distance characteristic value may be distant, and the second distance characteristic value is close. Certainly, the first distance characteristic value and the second distance characteristic value may also be value ranges, for example, the first distance characteristic value is 30 to 50 cm, and the second distance characteristic value is 5 to 10 cm, and the present invention sets no limitation on specific values of the first distance characteristic value and the second distance characteristic value.

In this way, in this embodiment of the present invention, when a voice call request is received, an acceleration characteristic value of a mobile terminal and a characteristic value of a distance from the mobile terminal to a target object are detected, and according to a change of the acceleration characteristic value and a change of the characteristic value of the distance from the mobile terminal to the target object, voice calls of different types may be determined to be established, which implements establishment processing of voice calls of different types on the mobile terminal according to different actions of a user in an in-vehicle environment, and improves efficiency and convenience of establishing voice calls of different types.

Figure 2:
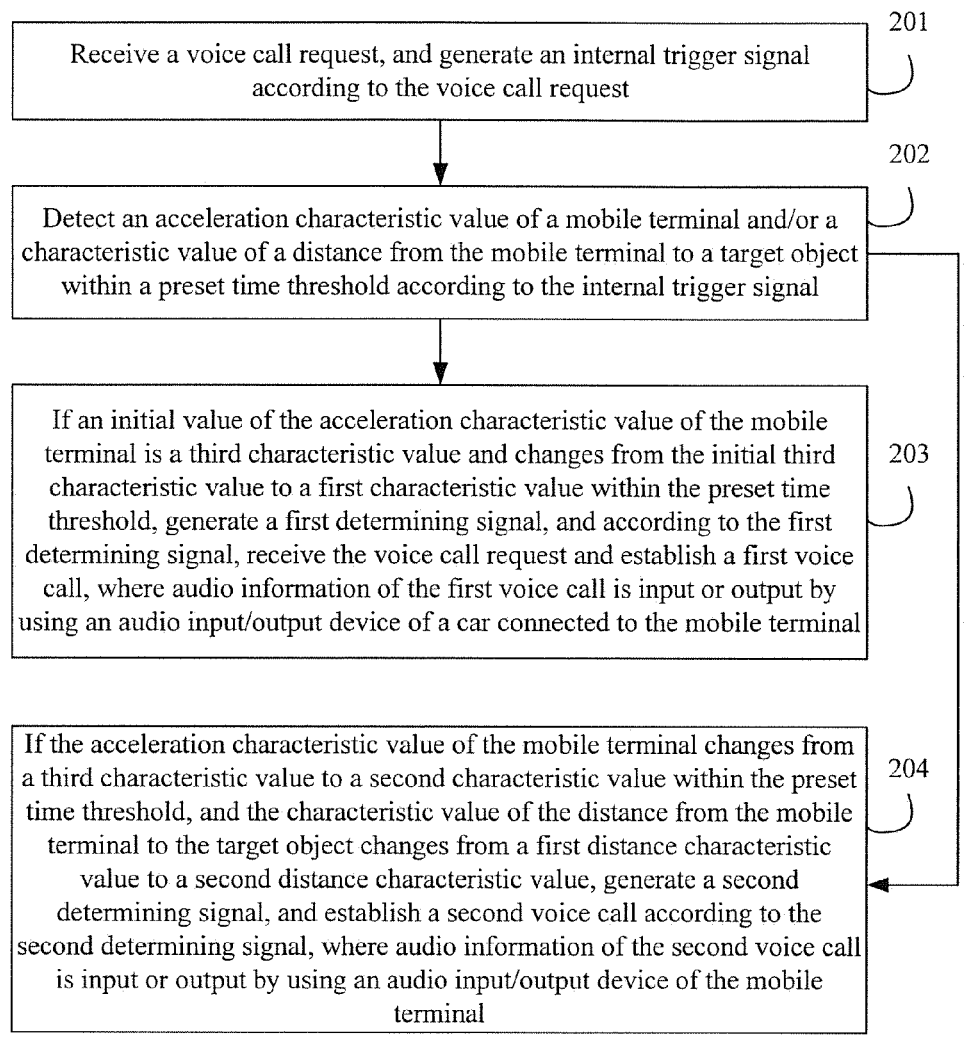
FIG. 2 is a flowchart of another voice call establishing method according to an embodiment of the present invention.

The foregoing embodiment describes a process of receiving a voice call request and establishing a voice call by a mobile terminal when an initial acceleration characteristic value of the mobile terminal is a first characteristic value, that is, in a state, being placed upwards and horizontally, of a screen of the terminal. The following describes, in an embodiment, a process of receiving a voice call request and establishing a voice call when the initial acceleration characteristic value of the mobile terminal is a third characteristic value, that is, in a state, being placed downwards and horizontally, of the screen of the terminal. FIG. 2 is a flowchart of another voice call establishing method according to an embodiment of the present invention. This embodiment is executed by a mobile terminal. As shown in the figure, this embodiment includes the following operating steps:

Step 201: Receive a voice call request, and generate an internal trigger signal according to the voice call request.

After receiving the voice call request, the mobile terminal may generate a radio frequency signal according to the voice call request, and after the radio frequency signal is sent to a processor, the processor may generate the internal trigger signal according to the radio frequency signal.

Step 202: Detect an acceleration characteristic value of the mobile terminal and/or a characteristic value of a distance from the mobile terminal to a target object within a preset time threshold according to the internal trigger signal.

Sensors such as an acceleration sensor, a proximity sensor, and a gyro sensor are built in the mobile terminal; when the processor generates the internal trigger signal, the acceleration sensor may detect, within the preset time threshold after the internal trigger signal is generated, acceleration characteristic values of the mobile terminal in three directions of an X-axis, a Y-axis, and a Z-axis, and in this way, a movement characteristic value of the mobile terminal may be detected.

Preferably, within the preset time threshold after the processor generates the internal trigger signal, the proximity sensor of the mobile terminal may detect characteristic values of angles between the mobile terminal and a horizontal plane in the X-axis, the Y-axis, and the Z-axis directions and the distance from the mobile terminal to the target object, that is, a human ear; in this way, whether the mobile terminal is distant from the human ear or is close to the human ear may be determined.

Step 203: If an initial value of the acceleration characteristic value of the mobile terminal is a third characteristic value and the acceleration characteristic value changes from the initial third characteristic value to the first characteristic value within the preset time threshold, generate the first determining signal, and according to the first determining signal, receive the voice call request and establish a first voice call, where audio information of the first voice call is input or output by using an audio input/output device of a car connected to the mobile terminal.

The third characteristic value may be 0 $m/s^2$ in an x-axis direction, 0 $m/s^2$ in a y-axis direction, and −9.81 $m/s^2$ in a z-axis direction, that is, a screen of the mobile terminal is placed downwards and horizontally; if the mobile terminal is placed downwards and horizontally when receiving the voice call request and changes to being placed upwards and horizontally within the preset time threshold, the first determining signal is generated and the first voice call is established. The first voice call refers to a voice call whose audio information in a voice call process is input or output by using the audio input/output device of the car.

It should be noted that, a value of the third characteristic value may be specifically set by a user for the mobile terminal; the present application document provides description by using the third characteristic value as a corresponding acceleration characteristic value detected when the screen of the mobile terminal is placed downwards and horizontally; however, the third characteristic value may also be another characteristic value set by the user, and this embodiment of the present invention sets no limitation on a specific value of the third characteristic value.

Step 204: If the acceleration characteristic value of the mobile terminal changes from the third characteristic value to a second characteristic value within the preset time threshold, and the characteristic value of the distance from the mobile terminal to the target object changes from a first distance characteristic value to a second distance characteristic value, generate the second determining signal, and establish a second voice call according to the second determining signal, where audio information of the second voice call is input or output by using an audio input/output device of the mobile terminal.

If the acceleration sensor of the mobile terminal detects that the acceleration characteristic value changes from the third characteristic value to the second characteristic value, that is, placing the screen downwards and horizontally changes to placing the screen non-horizontally, and the proximity sensor detects that the characteristic value of the distance between the mobile terminal and the target object (where the target object may be a human ear) changes from the first distance characteristic value to the second distance characteristic value, the second voice call is established, where the second voice call refers to a voice call whose audio information in a voice call process is input or output by using the audio input/output device of the mobile terminal itself.

The first distance characteristic value may be distant, and the second distance characteristic value is close. Certainly, the first distance characteristic value and the second distance characteristic value may also be value ranges, for example, the first distance characteristic value is 30 to 50 cm, and the second distance characteristic value is 5 to 10 cm, and the present invention sets no limitation on specific values of the first distance characteristic value and the second distance characteristic value.

In this way, in this embodiment of the present invention, when a voice call request is received, an acceleration characteristic value of a mobile terminal and a characteristic value of a distance from the mobile terminal to a target object are detected, and according to a change of the acceleration characteristic value and a change of the characteristic value of the distance from the mobile terminal to the target object, voice calls of different types may be determined to be established, which implements establishment processing of voice calls of different types on the mobile terminal according to different actions of a user in an in-vehicle environment, and improves efficiency and convenience of establishing voice calls of different types.

Figure 3A:
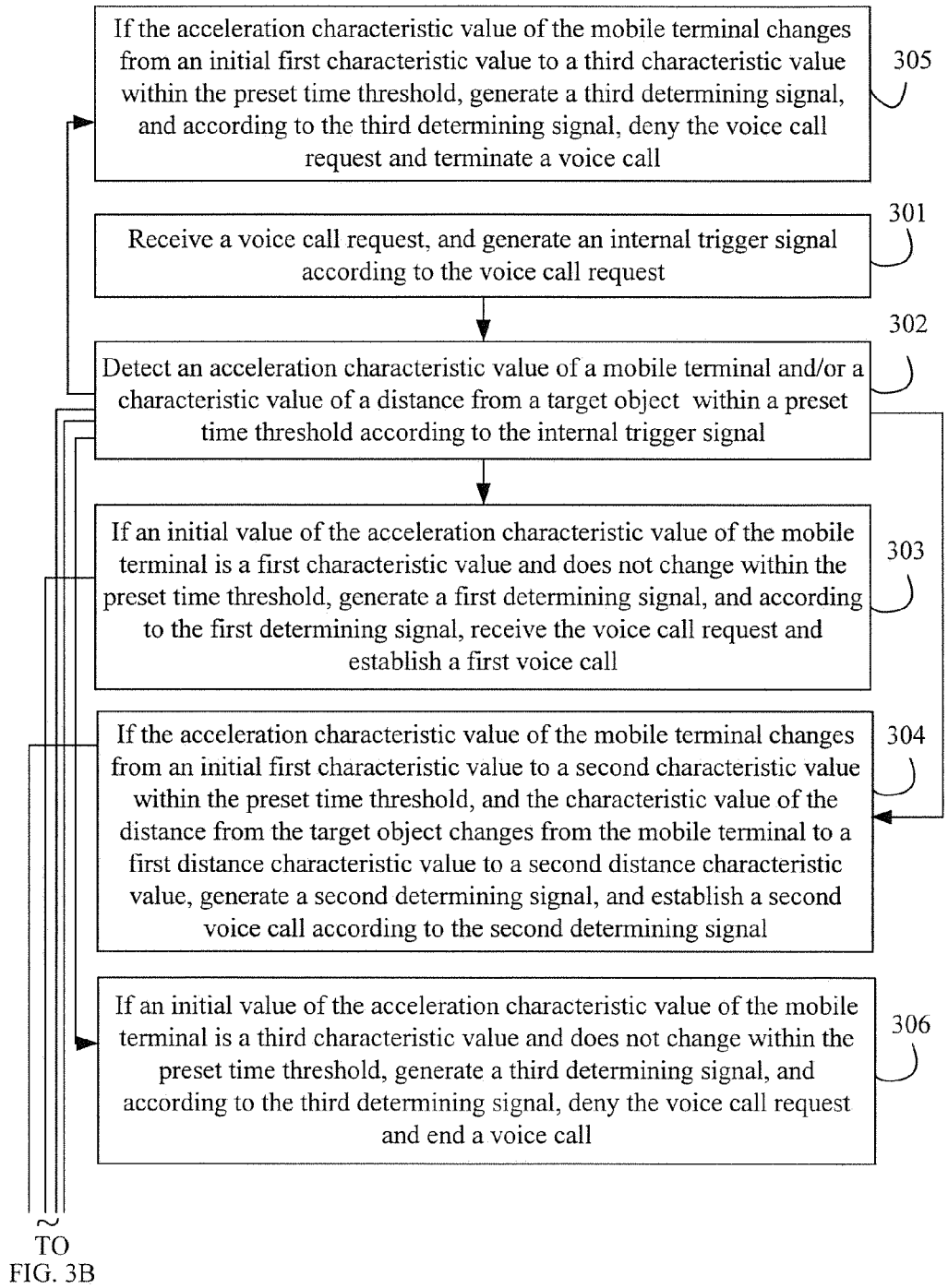
FIG. 3A and FIG. 3B are a flowchart of another voice call establishing method according to an embodiment of the present invention.
Figure 3B:
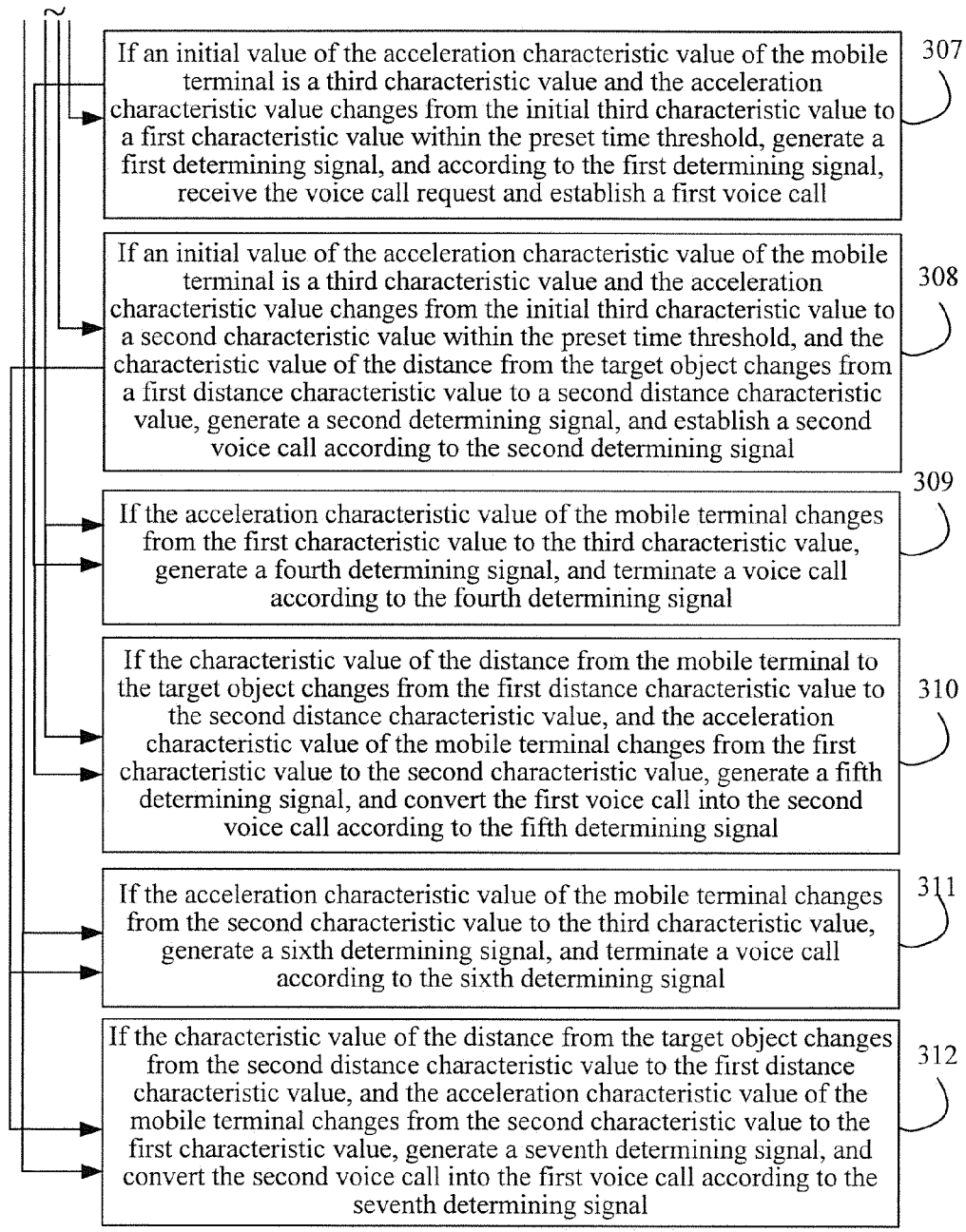

The foregoing two embodiments briefly describe a process of establishing a voice call, and the following describes, by using a specific embodiment, a process of establishing a voice call and a method for switching between voice calls of different types in a voice call process. FIG. 3A and FIG. 3B are a flowchart of another voice call establishing method according to an embodiment of the present invention. This embodiment is executed by a mobile terminal, and in this embodiment, a processing method after the mobile terminal receives a voice call request is described in detail. This embodiment includes the following steps:

Step 301: Receive a voice call request, and generate an internal trigger signal according to the voice call request.

Step 302: Detect an acceleration characteristic value of the mobile terminal and/or a characteristic value of a distance from the mobile terminal to a target object within a preset time threshold according to the internal trigger signal.

An acceleration sensor, a proximity sensor, and the like are built in the mobile terminal; after the internal trigger signal is generated, the acceleration sensor may detect a changing status of the acceleration characteristic value of the mobile terminal within the preset time threshold, and the proximity sensor may detect a changing status of the distance between the mobile terminal and the target object (which may be a human ear).

An initial value of the acceleration characteristic value may be a first characteristic value, or may be a third characteristic value, where the first characteristic value may be 0 $m/s^2$ in an x-axis direction, 0 $m/s^2$ in a y-axis direction, and 9.81 $m/s^2$ in a z-axis direction, that is, a screen of the mobile terminal is placed upwards and horizontally; the third characteristic value may be 0 $m/s^2$ in an x-axis direction, 0 $m/s^2$ in a y-axis direction, and −9.81 $m/s^2$ in a z-axis direction, that is, the screen of the mobile terminal is placed downwards and horizontally. Certainly, a specific value of the initial value of acceleration may be freely set, and this embodiment of the present invention provides description by using the first characteristic value and the third characteristic value as an example; however, these two characteristic values are not intended to limit the protection scope of the present invention.

If the initial value of the acceleration characteristic value is the first characteristic value, step 303, step 304, and step 305 may be separately performed according to the changing status of the acceleration characteristic value; if the initial value of the acceleration characteristic value is the third characteristic value, step 306, step 307, and step 308 may be separately performed according to the changing status of the acceleration characteristic value.

Step 303: If an initial value of the acceleration characteristic value of the mobile terminal is a first characteristic value and does not change within the preset time threshold, generate a first determining signal, and according to the first determining signal, receive the voice call request and establish a first voice call.

If the initial acceleration characteristic value of the mobile terminal is the first characteristic value, and after the voice call request is received, the acceleration characteristic value does not change within the preset time threshold, that is, the mobile terminal is always in a state in which the screen is placed upwards and horizontally, the first determining signal is generated, and according to the first determining signal, a processor receives the voice call request and establishes the first voice call, that is, audio information of the voice call is input and output by using an audio input/output device of a car.

Step 304: If the acceleration characteristic value of the mobile terminal changes from the initial first characteristic value to a second characteristic value within the preset time threshold, and the characteristic value of the distance from the mobile terminal to the target object changes from a first distance characteristic value to a second distance characteristic value, generate a second determining signal, and establish a second voice call according to the second determining signal.

If the initial acceleration characteristic value of the mobile terminal is the first characteristic value, the acceleration characteristic value changes from the first characteristic value to the second characteristic value within the preset time threshold after the voice call request is received, that is, a state, being placed upwards and horizontally, of the screen of the mobile terminal changes to a state, being placed non-horizontally, of the screen, and the proximity sensor detects that a distance between the mobile terminal and the human ear changes from the first distance characteristic value to the second distance characteristic value, that is, the mobile terminal is moved from a location distant from the human ear to a location close to the human ear, the second determining signal is generated, and according to the second determining signal, the processor receives the voice call request and establishes the second voice call, that is, audio information of the voice call is input and output by using an audio input/output device of the mobile terminal.

Step 305: If the acceleration characteristic value of the mobile terminal changes from the initial first characteristic value to a third characteristic value within the preset time threshold, generate a third determining signal, and according to the third determining signal, deny the voice call request and terminate a voice call.

If the initial acceleration characteristic value of the mobile terminal is the first characteristic value, and the acceleration characteristic value changes from the first characteristic value to the third characteristic value within the preset time threshold after the voice call request is received, that is, a state, being placed upwards and horizontally, of the screen of the mobile terminal changes to a state, being placed downwards and horizontally, of the screen, the third determining signal is generated, and according to the third determining signal, the processor denies the voice call request and terminates a voice call.

Step 306: If the initial value of the acceleration characteristic value of the mobile terminal is a third characteristic value and does not change within the preset time threshold, generate a third determining signal, and according to the third determining signal, deny the voice call request and end a voice call.

If an initial state of the mobile terminal is that the screen is placed downwards and horizontally, that is, the initial value of the acceleration characteristic value is the third characteristic value, and does not change within the preset time threshold, the voice call request is denied.

Step 307: If the initial value of the acceleration characteristic value of the mobile terminal is the third characteristic value and the acceleration characteristic value changes from the initial third characteristic value to the first characteristic value within the preset time threshold, generate a first determining signal, and according to the first determining signal, receive the voice call request and establish a first voice call.

If the initial state of the mobile terminal is that the screen is placed downwards and horizontally, that is, the initial value of the acceleration characteristic value is the third characteristic value, and changes to that the screen is placed upwards and horizontally within the preset time threshold, the first determining signal is generated, and the first voice call is established, that is, audio information of the voice call is input and output by using the audio input/output device of the car.

Step 308: If the initial value of the acceleration characteristic value of the mobile terminal is the third characteristic value and the acceleration characteristic value changes from the initial third characteristic value to the second characteristic value within the preset time threshold, and the characteristic value of the distance from the mobile terminal to the target object changes from the first distance characteristic value to the second distance characteristic value, generate the second determining signal, and establish a second voice call according to the second determining signal.

If the initial state of the mobile terminal is that the screen is placed downwards and horizontally, that is, the initial value of the acceleration characteristic value is the third characteristic value, and changes to that the screen is placed non-horizontally within the preset time threshold, and the proximity sensor detects that the distance between the mobile terminal and the human ear changes from the first distance characteristic value to the second distance characteristic value, that is, the mobile terminal is moved from a location distant from the human ear to a location close to the human ear, the second determining signal is generated, and the processor receives the voice call request according to the second determining signal, and establishes the second voice call according to the second determining signal, that is, audio information of the voice call is input and output by using an audio input/output device of the mobile terminal.

Step 309: Detect the acceleration characteristic value of the mobile terminal; if the acceleration characteristic value of the mobile terminal changes from the first characteristic value to the third characteristic value, generate a fourth determining signal, and terminate a voice call according to the fourth determining signal.

After the first voice call is established, the acceleration sensor in the terminal continues to detect the acceleration characteristic value of the mobile terminal; if the first characteristic value changes to the third characteristic value, that is, the state, being placed upwards and horizontally, of the screen of the terminal changes to the state, being placed downwards and horizontally, of the screen, the fourth determining signal is determined, that is, the first voice call is ended.

Step 310: Detect the characteristic value of the distance from the mobile terminal to the target object and the acceleration characteristic value of the mobile terminal; if the characteristic value of the distance from the mobile terminal to the target object changes from the first distance characteristic value to the second distance characteristic value, and the acceleration characteristic value of the mobile terminal changes from the first characteristic value to the second characteristic value, generate a fifth determining signal, and convert the first voice call into the second voice call according to the fifth determining signal.

After the first voice call is established, the acceleration sensor in the terminal continues to detect the acceleration characteristic value of the mobile terminal, and the proximity sensor continues to detect the characteristic value of the distance between the mobile terminal and the target object; if the acceleration characteristic value changes from the first characteristic value to the second characteristic value, that is, the state, being placed upwards and horizontally, of the screen of the terminal changes to a state, being placed non-horizontally, of the screen, and the characteristic value of the distance from the mobile terminal to the target object changes from the first distance characteristic value to the second distance characteristic value, that is, the mobile terminal is moved from a location distant from the human ear to a location close to the human ear, the fifth determining signal is generated, that is, the first voice call is converted into the second voice call, that is, an audio input/output path of the voice call is switched from the audio input/output device of the car into the built-in audio input/output device of the mobile terminal.

Step 311: Detect the acceleration characteristic value of the mobile terminal; if the acceleration characteristic value of the mobile terminal changes from the second characteristic value to the third characteristic value, generate a sixth determining signal, and terminate a voice call according to the sixth determining signal.

After the second voice call is established, the acceleration sensor in the terminal continues to detect the acceleration characteristic value of the mobile terminal; if the second characteristic value changes to the third characteristic value, that is, the state, being placed non-horizontally, of the terminal changes to the state, being placed downwards and horizontally, of the screen, the sixth determining signal is determined, that is, the second voice call is ended.

Step 312: Detect the characteristic value of the distance from the mobile terminal to the target object and the acceleration characteristic value of the mobile terminal; if the characteristic value of the distance from the mobile terminal to the target object changes from the second distance characteristic value to the first distance characteristic value, and the acceleration characteristic value of the mobile terminal changes from the second characteristic value to the first characteristic value, generate a seventh determining signal, and convert the second voice call into the first voice call according to the seventh determining signal.

After the second voice call is established, the acceleration sensor in the terminal continues to detect the acceleration characteristic value of the mobile terminal, and the proximity sensor continues to detect the characteristic value of the distance between the mobile terminal and the target object; if the acceleration characteristic value changes from the second characteristic value to the first characteristic value, that is, the state, being placed non-horizontally, of the terminal changes to the state, being placed upwards and horizontally, of the screen, and the characteristic value of the distance from the mobile terminal to the target object changes from the second distance characteristic value to the first distance characteristic value, that is, the mobile terminal is moved from a location close to the human ear to a location distant from the human ear, the seventh determining signal is generated, that is, the second voice call is converted into the first voice call, that is, an audio input/output path of the voice call is switched from the built-in audio input/output device of the mobile terminal into the audio input/output device of the car.

In this embodiment of the present invention, when a voice call request is received, an acceleration characteristic value of a mobile terminal and a characteristic value of a distance from the mobile terminal to a target object are detected, and whether to establish voice calls of different types or to deny a voice call may be determined according to a change of the acceleration characteristic value and a change of the characteristic value of the distance from the mobile terminal to the target object; and in a process of a voice call, by detecting the change of the acceleration characteristic value of the mobile terminal and the change of the characteristic value of the distance, switching between voice calls of different types may be implemented, or a voice call may be automatically ended. In this way, in this embodiment of the present invention, establishment or termination processing of a voice call on the mobile terminal in an in-vehicle environment or switch processing between the voice calls of different types is implemented, which improves efficiency and convenience of establishing a voice call.

Figure 4:
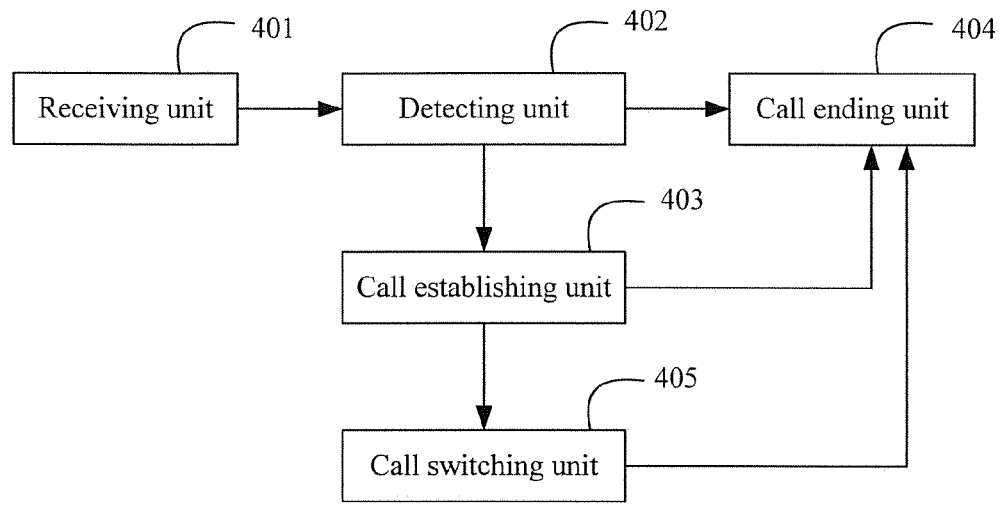
FIG. 4 is a schematic diagram of a voice call establishing apparatus according to an embodiment of the present invention.

Correspondingly, an embodiment of the present invention further provides a voice call establishing apparatus, and FIG. 4 is a schematic diagram of a voice call establishing apparatus according to an embodiment of the present invention. As shown in the figure, this embodiment includes the following units: a receiving unit 401, a detecting unit 402, and a call establishing unit 403.

The receiving unit 401 is configured to receive a voice call request, generate an internal trigger signal according to the voice call request, and transmit the internal trigger signal to the detecting unit.

The detecting unit 402 is configured to receive the internal trigger signal, detect an acceleration characteristic value of a mobile terminal and/or a characteristic value of a distance from the mobile terminal to a target object within a preset time threshold according to the internal trigger signal, and transmit, to the call establishing unit, the acceleration characteristic value of the mobile terminal and the characteristic value of the distance from the mobile terminal to the target object.

The call establishing unit 403 is configured to receive the acceleration characteristic value of the mobile terminal and the characteristic value of the distance from the mobile terminal to the target object; and if an initial value of the acceleration characteristic value of the mobile terminal is a first characteristic value and does not change within the preset time threshold, generate a first determining signal, and according to the first determining signal, receive the voice call request and establish a first voice call, where audio information of the first voice call is input or output by using an audio input/output device of a car connected to the mobile terminal; and if the acceleration characteristic value of the mobile terminal changes from the initial first characteristic value to a second characteristic value within the preset time threshold, and the characteristic value of the distance from the mobile terminal to the target object changes from a first distance characteristic value to a second distance characteristic value, generate a second determining signal, and establish a second voice call according to the second determining signal, where audio information of the second voice call is input or output by using an audio input/output device of the mobile terminal.

Specifically, if the initial acceleration characteristic value of the mobile terminal is the first characteristic value, and the acceleration characteristic value does not change within the preset time threshold after the voice call request is received, that is, the mobile terminal is always in a state in which a screen is placed upwards and horizontally, the first determining signal is generated, and according to the first determining signal, a processor receives the voice call request and establishes the first voice call, that is, the audio information of the voice call is input and output by using the audio input/output device of the car.

If the initial acceleration characteristic value of the mobile terminal is the first characteristic value, the acceleration characteristic value changes from the first characteristic value to the second characteristic value within the preset time threshold after the voice call request is received, that is, a state, being placed upwards and horizontally, of the screen of the mobile terminal changes to a state, being placed non-horizontally, of the screen, and a proximity sensor detects that a distance between the mobile terminal and a human ear changes from the first distance characteristic value to the second distance characteristic value, that is, the mobile terminal is moved from a location distant from the human ear to a location close to the human ear, the second determining signal is generated, and according to the second determining signal, the processor receives the voice call request and establishes the second voice call, that is, the audio information of the voice call is input and output by using the audio input/output device of the mobile terminal.

Preferably, the apparatus provided in this embodiment of the present invention further includes a call ending unit 404, and the call ending unit 404 is configured to: receive the acceleration characteristic value of the mobile terminal transmitted by the detecting unit; and if the acceleration characteristic value of the mobile terminal changes from the initial first characteristic value to a third characteristic value within the preset time threshold, generate a third determining signal, and according to the third determining signal, deny the voice call request and terminate a voice call.

Preferably, the initial value of the acceleration characteristic value in the apparatus provided in this embodiment of the present invention may further be the third characteristic value, that is, an initial state of the mobile terminal is that the screen is placed downwards and horizontally; the call ending unit 404 is further configured to: if the initial value of the acceleration characteristic value of the mobile terminal is the third characteristic value and does not change within the preset time threshold, generate the third determining signal, and according to the third determining signal, deny the voice call request and end a voice call.

If the initial value of the acceleration characteristic value is further the third characteristic value, the call establishing unit 403 is further configured to: if the initial value of the acceleration characteristic value of the mobile terminal is the third characteristic value and the acceleration characteristic value changes from the initial third characteristic value to the first characteristic value within the preset time threshold, generate the first determining signal, and according to the first determining signal, receive the voice call request and establish the first voice call.

If the initial value of the acceleration characteristic value is further the third characteristic value, the call establishing unit 403 is further configured to: if the initial value of the acceleration characteristic value of the mobile terminal is the third characteristic value and the acceleration characteristic value changes from the initial third characteristic value to the second characteristic value within the preset time threshold, and the characteristic value of the distance from the mobile terminal to the target object changes from the first distance characteristic value to the second distance characteristic value, generate the second determining signal, and establish the second voice call according to the second determining signal.

After the first voice call is established, the detecting unit 402 may further continue to detect the acceleration characteristic value of the mobile terminal; if it is detected that the acceleration characteristic value changes from the first characteristic value to the third characteristic value, the call ending unit 404 is further configured to receive the acceleration characteristic value that is of the mobile terminal and detected by the detecting unit; and if the acceleration characteristic value of the mobile terminal changes from the first characteristic value to the third characteristic value, generate a fourth determining signal, and terminate a voice call according to the fourth determining signal.

After the first voice call is established, if necessary, the mobile terminal may switch the first voice call to the second voice call. Preferably, the apparatus provided in this embodiment of the present invention further includes a call switching unit 405, and the call switching unit 405 is configured to receive the characteristic value of the distance from the mobile terminal to the target object and the acceleration characteristic value of the mobile terminal that are detected by the detecting unit; and if the characteristic value of the distance from the mobile terminal to the target object changes from the first distance characteristic value to the second distance characteristic value, and the acceleration characteristic value of the mobile terminal changes from the first characteristic value to the second characteristic value, generate a fifth determining signal, and convert the first voice call into the second voice call according to the fifth determining signal.

After the second voice call is established, the detecting unit 402 may further continue to detect the acceleration characteristic value of the mobile terminal; if it is detected that the acceleration characteristic value changes from the second characteristic value to the third characteristic value, the call ending unit 404 is further configured to receive the acceleration characteristic value that is of the mobile terminal and detected by the detecting unit; and if the acceleration characteristic value of the mobile terminal changes from the second characteristic value to the third characteristic value, generate a sixth determining signal, and terminate a voice call according to the sixth determining signal.

After the second voice call is established, if necessary, the mobile terminal may switch the second voice call to the first voice call. The call switching unit 405 is further configured to receive the characteristic value of the distance from the mobile terminal to the target object and the acceleration characteristic value of the mobile terminal that are detected by the detecting unit; and if the characteristic value of the distance from the mobile terminal to the target object changes from the second distance characteristic value to the first distance characteristic value, and the acceleration characteristic value of the mobile terminal changes from the second characteristic value to the first characteristic value, generate a seventh determining signal, and convert the second voice call into the first voice call according to the seventh determining signal.

In this way, in this embodiment of the present invention, establishment or termination processing of a voice call on a mobile terminal in an in-vehicle environment or switch processing between voice calls of different types is implemented, which improves efficiency and convenience of establishing a voice call.

Figure 5:
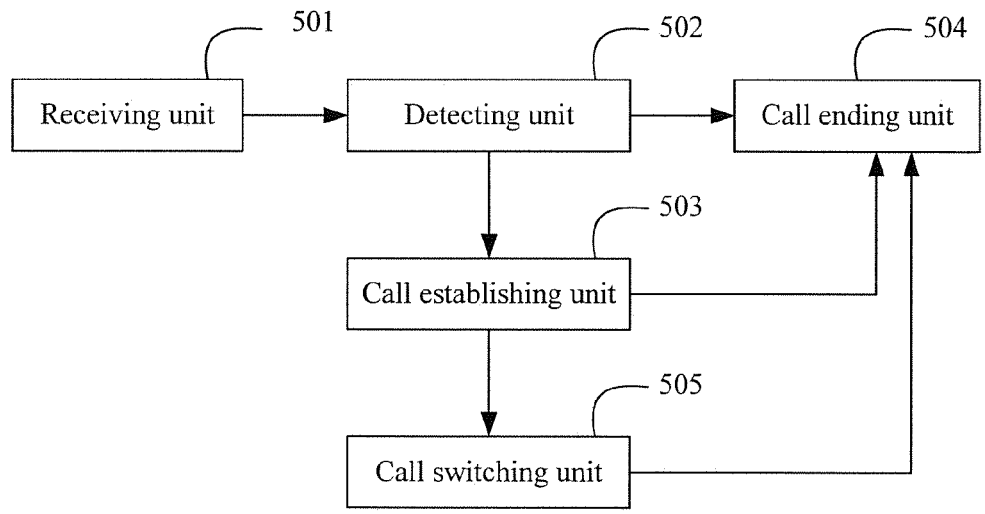
FIG. 5 is a schematic diagram of another voice call establishing apparatus according to an embodiment of the present invention.

Correspondingly, an embodiment of the present invention further provides a voice call establishing apparatus, and FIG. 5 is a schematic diagram of another voice call establishing apparatus according to an embodiment of the present invention. As shown in FIG. 5, this embodiment includes the following units: a receiving unit 501, a detecting unit 502, and a call establishing unit 503.

The receiving unit 501 is configured to receive a voice call request, generate an internal trigger signal according to the voice call request, and transmit the internal trigger signal to a detecting unit.

After receiving the voice call request, a mobile terminal may generate a radio frequency signal according to the voice call request, and after the radio frequency signal is sent to a processor, the processor may generate the internal trigger signal according to the radio frequency signal.

The detecting unit 502 is configured to detect an acceleration characteristic value of the mobile terminal and/or a characteristic value of a distance from the mobile terminal to a target object within a preset time threshold according to the internal trigger signal, and transmit, to the call establishing unit, the acceleration characteristic value of the mobile terminal and the characteristic value of the distance from the mobile terminal to the target object.

Specifically, when the processor generates the internal trigger signal, an acceleration sensor may detect, within the preset time threshold after the internal trigger signal is generated, acceleration characteristic values of the mobile terminal in three directions of an X-axis, a Y-axis, and a Z-axis, and in this way, a movement characteristic value of the mobile terminal may be detected. A proximity sensor may detect characteristic values of angles between the mobile terminal and a horizontal plane in the X-axis, the Y-axis, and the Z-axis directions and the distance from the mobile terminal to the target object, that is, a human ear; in this way, whether the mobile terminal is distant from the human ear or is close to the human ear may be determined.

The call establishing unit 503 is configured to receive the acceleration characteristic value of the mobile terminal and the characteristic value of the distance from the mobile terminal to the target object; and if an initial value of the acceleration characteristic value of the mobile terminal is a third characteristic value and the acceleration characteristic value changes from the initial third characteristic value to a first characteristic value within the preset time threshold, generate a first determining signal, and according to the first determining signal, receive the voice call request and establish a first voice call, where audio information of the first voice call is input or output by using an audio input/output device of a car connected to the mobile terminal; and if the acceleration characteristic value of the mobile terminal changes from the third characteristic value to a second characteristic value within the preset time threshold, and the characteristic value of the distance from the mobile terminal to the target object changes from a first distance characteristic value to a second distance characteristic value, generate a second determining signal, and establish a second voice call according to the second determining signal, where audio information of the second voice call is input or output by using an audio input/output device of the mobile terminal.

Preferably, the apparatus provided in this embodiment of the present invention further includes a call ending unit 504, and the call ending unit 504 is configured to: if the initial value of the acceleration characteristic value of the mobile terminal is the third characteristic value and does not change within the preset time threshold, generate the third determining signal, and according to the third determining signal, deny the voice call request and end a voice call.

Preferably, the initial value of the acceleration characteristic value in the apparatus provided in this embodiment of the present invention may further be the first characteristic value, that is, an initial state of the mobile terminal is that a screen is placed downwards and horizontally; the call ending unit 504 is further configured to: if the initial value of the acceleration characteristic value of the mobile terminal is the first characteristic value and changes from the first characteristic value to the third characteristic value within the preset time threshold, generate the third determining signal, and according to the third determining signal, deny the voice call request and terminate a voice call.

If the initial value of the acceleration characteristic value is the first characteristic value, the call establishing unit 503 is further configured to: if the initial value of the acceleration characteristic value of the mobile terminal is the first characteristic value and does not change within the preset time threshold, generate the first determining signal, and according to the first determining signal, receive the voice call request and establish the first voice call.

If the initial value of the acceleration characteristic value is the first characteristic value, the call establishing unit 503 is further configured to: if the initial value of the acceleration characteristic value of the mobile terminal is the first characteristic value and changes from the first characteristic value to the second characteristic value within the preset time threshold, and the characteristic value of the distance from the mobile terminal to the target object changes from the first distance characteristic value to the second distance characteristic value, generate the second determining signal, and establish the second voice call according to the second determining signal.

After the first voice call is established, the detecting unit 502 may further continue to detect the acceleration characteristic value of the mobile terminal; if it is detected that the acceleration characteristic value changes from the first characteristic value to the third characteristic value, the call ending unit 504 is further configured to receive the acceleration characteristic value that is of the mobile terminal and detected by the detecting unit; and if the acceleration characteristic value of the mobile terminal changes from the first characteristic value to the third characteristic value, generate a fourth determining signal, and terminate a voice call according to the fourth determining signal.

After the first voice call is established, if necessary, the mobile terminal may switch the first voice call to the second voice call. Preferably, the apparatus provided in this embodiment of the present invention further includes a call switching unit 505, and the call switching unit 505 is configured to receive the characteristic value of the distance from the mobile terminal to the target object and the acceleration characteristic value of the mobile terminal that are detected by the detecting unit; and if the characteristic value of the distance from the mobile terminal to the target object changes from the first distance characteristic value to the second distance characteristic value, and the acceleration characteristic value of the mobile terminal changes from the first characteristic value to the second characteristic value, generate a fifth determining signal, and convert the first voice call into the second voice call according to the fifth determining signal.

After the second voice call is established, the detecting unit 502 may further continue to detect the acceleration characteristic value of the mobile terminal; if it is detected that the acceleration characteristic value changes from the second characteristic value to the third characteristic value, the call ending unit 504 is further configured to detect the acceleration characteristic value of the mobile terminal; and if the acceleration characteristic value of the mobile terminal changes from the second characteristic value to the third characteristic value, generate a sixth determining signal, and terminate a voice call according to the sixth determining signal.

After the second voice call is established, if necessary, the mobile terminal may switch the second voice call to the first voice call. The call switching unit 505 is further configured to receive the characteristic value of the distance from the mobile terminal to the target object and the acceleration characteristic value of the mobile terminal that are detected by the detecting unit; and if the characteristic value of the distance from the mobile terminal to the target object changes from the second distance characteristic value to the first distance characteristic value, and the acceleration characteristic value of the mobile terminal changes from the second characteristic value to the first characteristic value, generate a seventh determining signal, and convert the second voice call into the first voice call according to the seventh determining signal.

In this way, in this embodiment of the present invention, establishment or termination processing of a voice call on a mobile terminal in an in-vehicle environment or switch processing between voice calls of different types is implemented, which improves efficiency and convenience of establishing a voice call.

Figure 6:
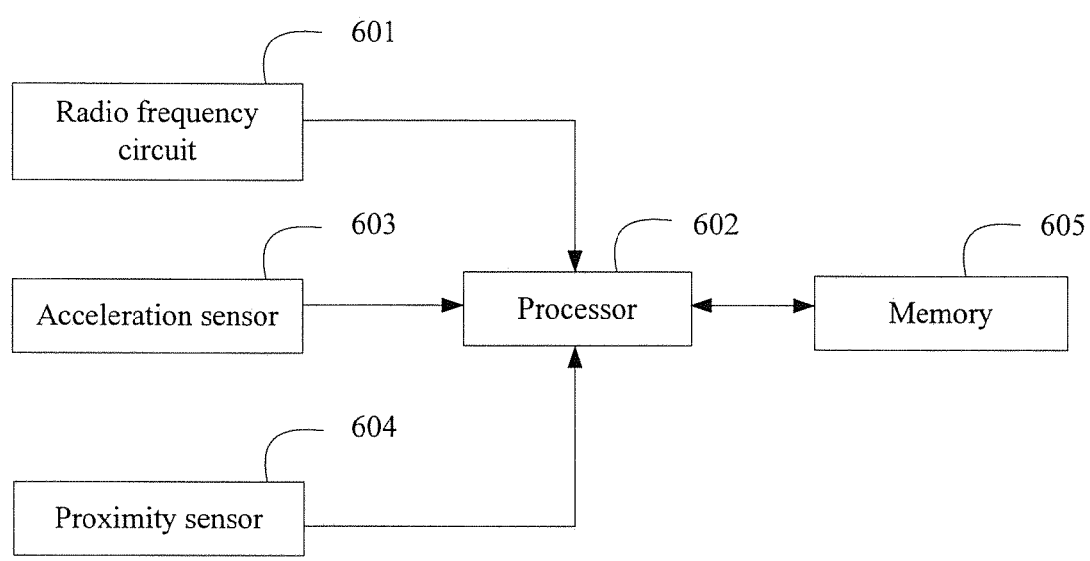
FIG. 6 is a schematic diagram of a mobile terminal according to an embodiment of the present invention.

Correspondingly, an embodiment of the present invention further provides a mobile terminal, and FIG. 6 is a schematic diagram of a mobile terminal according to an embodiment of the present invention. As shown in the figure, in this embodiment, the mobile terminal includes a radio frequency circuit 601, a processor 602, an acceleration sensor 603, a proximity sensor 604, and a memory 605. Functions of components are as follows:

The radio frequency circuit 601 is configured to receive a voice call request, and generate an internal trigger signal according to the voice call request.

The acceleration sensor 603 is configured to detect an acceleration characteristic value of the mobile terminal within a preset time threshold according to the internal trigger signal.

The proximity sensor 604 is configured to detect a characteristic value of a distance from the mobile terminal to a target object within the preset time threshold according to the internal trigger signal.

The processor 602 is configured to: if an initial value of the acceleration characteristic value of the mobile terminal is a first characteristic value and does not change within the preset time threshold, generate a first determining signal, and according to the first determining signal, receive the voice call request and establish a first voice call, where audio information of the first voice call is input or output by using an audio input/output device of a car connected to the mobile terminal.

The processor 602 is further configured to: if the acceleration characteristic value of the mobile terminal changes from the initial first characteristic value to a second characteristic value within the preset time threshold, and the characteristic value of the distance from the mobile terminal to the target object changes from a first distance characteristic value to a second distance characteristic value, generate a second determining signal, and establish a second voice call according to the second determining signal, where audio information of the second voice call is input or output by using an audio input/output device of the mobile terminal.

The processor 602 is further configured to: if the acceleration characteristic value of the mobile terminal changes from the initial first characteristic value to a third characteristic value within the preset time threshold, generate a third determining signal, and according to the third determining signal, deny the voice call request and terminate a voice call.

After the acceleration sensor 603 and the proximity sensor 604 detect the acceleration characteristic value of the mobile terminal and/or the characteristic value of the distance from the mobile terminal to the target object within the preset time threshold according to the internal trigger signal, the processor 602 is further configured to: if the initial value of the acceleration characteristic value of the mobile terminal is the third characteristic value and does not change within the preset time threshold, generate the third determining signal, and according to the third determining signal, deny the voice call request and end a voice call.

After the acceleration sensor 603 and the proximity sensor 604 detect the acceleration characteristic value of the mobile terminal and/or the characteristic value of the distance from the mobile terminal to the target object within the preset time threshold according to the internal trigger signal, the processor 602 is further configured to: if the initial value of the acceleration characteristic value of the mobile terminal is the third characteristic value and the acceleration characteristic value changes from the initial third characteristic value to the first characteristic value within the preset time threshold, generate the first determining signal, and according to the first determining signal, receive the voice call request and establish the first voice call.

After the acceleration sensor 603 and the proximity sensor 604 detect the acceleration characteristic value of the mobile terminal and/or the characteristic value of the distance from the mobile terminal to the target object within the preset time threshold according to the internal trigger signal, the processor 602 is further configured to: if the initial value of the acceleration characteristic value of the mobile terminal is the third characteristic value and the acceleration characteristic value changes from the initial third characteristic value to the second characteristic value within the preset time threshold, and the characteristic value of the distance from the mobile terminal to the target object changes from the first distance characteristic value to the second distance characteristic value, generate the second determining signal, and establish the second voice call according to the second determining signal.

After the first voice call is established, the acceleration sensor 603 and the proximity sensor 604 continue to detect the acceleration characteristic value of the mobile terminal and the characteristic value of the distance from the mobile terminal to the target object; if the acceleration characteristic value of the mobile terminal changes from the first characteristic value to the third characteristic value, the processor 602 generates a fourth determining signal, and terminates a voice call according to the fourth determining signal.

After the first voice call is established, the acceleration sensor 603 and the proximity sensor 604 continue to detect the acceleration characteristic value of the mobile terminal and the characteristic value of the distance from the mobile terminal to the target object; if the characteristic value of the distance from the mobile terminal to the target object changes from the first distance characteristic value to the second distance characteristic value, and the acceleration characteristic value of the mobile terminal changes from the first characteristic value to the second characteristic value, the processor 602 generates a fifth determining signal, and converts the first voice call into the second voice call according to the fifth determining signal.

After the second voice call is established, the acceleration sensor 603 and the proximity sensor 604 continue to detect the acceleration characteristic value of the mobile terminal and the characteristic value of the distance from the mobile terminal to the target object; if the acceleration characteristic value of the mobile terminal changes from the second characteristic value to the third characteristic value, the processor 602 generates a sixth determining signal, and terminates a voice call according to the sixth determining signal.

After the second voice call is established, the acceleration sensor 603 and the proximity sensor 604 continue to detect the acceleration characteristic value of the mobile terminal and the characteristic value of the distance from the mobile terminal to the target object; if the characteristic value of the distance from the mobile terminal to the target object changes from the second distance characteristic value to the first distance characteristic value, and the acceleration characteristic value of the mobile terminal changes from the second characteristic value to the first characteristic value, the processor 602 generates a seventh determining signal, and converts the second voice call into the first voice call according to the seventh determining signal.

It should be noted that, the preset time threshold, the first characteristic value, the second characteristic value, the third characteristic value, the first distance characteristic value, and the second distance characteristic value that are mentioned in this embodiment are all thresholds that are set for establishing, switching, and terminating a voice call request in the mobile terminal, and these thresholds may be stored in the memory 605 of the mobile terminal. After receiving characteristic values detected by the acceleration sensor and the proximity sensor, the processor may access these thresholds in the memory 605, and determine, according to these thresholds, whether to establish the first voice call and the second voice call or to deny a call.

By using the foregoing solution, in this embodiment of the present invention, establishment or termination processing of a voice call on a mobile terminal in an in-vehicle environment or switch processing between voice calls of different types is implemented, which improves efficiency and convenience of establishing a voice call.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may reside in a random access memory (RAN), a memory, a read-only memory (RUM), an electrically programmable ROM, an electrically erasable programmable ROM, a register, a hard disk, a removable disk, a CD-ROM, or any other form of storage medium known in the art.

In the foregoing specific implementation manners, the objective, technical solutions, and benefits of the present invention are further described in detail. It should be understood that the foregoing descriptions are merely specific implementation manners of the present invention, but are not intended to limit the protection scope of the present invention. Any modification, equivalent replacement, or improvement made without departing from the spirit and principle of the present invention should fall within the protection scope of the present invention.

What is claimed is:

1. A voice call establishing method, comprising:
receiving a voice call request, and generating an internal trigger signal according to the voice call request;
detecting an acceleration characteristic value of a mobile terminal and/or a characteristic value of a distance from the mobile terminal to a target object within a preset time threshold according to the internal trigger signal; and
if an initial value of the acceleration characteristic value of the mobile terminal is a first characteristic value and does not change within the preset time threshold, generating a first determining signal, and according to the first determining signal, receiving the voice call request and establishing a first voice call, wherein audio information of the first voice call is input or output by using an audio input/output device of a car connected to the mobile terminal; and
if the acceleration characteristic value of the mobile terminal changes from the initial first characteristic value to a second characteristic value within the preset time threshold, and the characteristic value of the distance from the mobile terminal to the target object changes from a first distance characteristic value to a second distance characteristic value, generating a second determining signal, and establishing a second voice call according to the second determining signal, wherein audio information of the second voice call is input or output by using an audio input/output device of the mobile terminal.

2. The voice call establishing method according to claim 1, wherein if the acceleration characteristic value of the mobile terminal changes from the initial first characteristic value to a third characteristic value within the preset time threshold, generating a third determining signal, denying the voice call request according to the third determining signal, and terminating a voice call according to the third determining signal.

3. The voice call establishing method according to claim 2, wherein after detecting an acceleration characteristic value of a mobile terminal and/or a characteristic value of a distance from the mobile terminal to a target object within a preset time threshold according to the internal trigger signal, further comprising: if the initial value of the acceleration characteristic value of the mobile terminal is the third characteristic value and does not change within the preset time threshold, generating the third determining signal, and according to the third determining signal, denying the voice call request and ending a voice call.

4. The voice call establishing method according to claim 1, wherein after detecting an acceleration characteristic value of a mobile terminal and/or a characteristic value of a distance from the mobile terminal to a target object within a preset time threshold according to the internal trigger signal, the method further comprises:

if the initial value of the acceleration characteristic value of the mobile terminal is the third characteristic value and the acceleration characteristic value changes from the initial third characteristic value to the first characteristic value within the preset time threshold, generating the first determining signal, and according to the first determining signal, receiving the voice call request and establishing the first voice call.

5. The voice call establishing method according to claim 1, wherein after detecting an acceleration characteristic value of a mobile terminal and/or a characteristic value of a distance from the mobile terminal to a target object within a preset time threshold according to the internal trigger signal, the method further comprises:

if the initial value of the acceleration characteristic value of the mobile terminal is the third characteristic value and the acceleration characteristic value changes from the initial third characteristic value to the second characteristic value within the preset time threshold, and the characteristic value of the distance from the mobile terminal to the target object changes from the first distance characteristic value to the second distance characteristic value, generating the second determining signal, and establishing the second voice call according to the second determining signal.

6. The voice call establishing method according to claim 1, wherein after establishing a first voice call, the method further comprises:

detecting the acceleration characteristic value of the mobile terminal; and if the acceleration characteristic value of the mobile terminal changes from the first characteristic value to the third characteristic value, generating a fourth determining signal, and terminating the voice call according to the fourth determining signal.

7. The voice call establishing method according to claim 1, wherein after establishing a first voice call, the method further comprises:

detecting the characteristic value of the distance from the mobile terminal to the target object and the acceleration characteristic value of the mobile terminal; and if the characteristic value of the distance from the mobile terminal to the target object changes from the first distance characteristic value to the second distance characteristic value, and the acceleration characteristic value of the mobile terminal changes from the first characteristic value to the second characteristic value, generating a fifth determining signal, and converting the first voice call into the second voice call according to the fifth determining signal.

8. The voice call establishing method according to claim 1, wherein after establishing a second voice call, the method further comprises:

detecting the acceleration characteristic value of the mobile terminal; and if the acceleration characteristic value of the mobile terminal changes from the second characteristic value to the third characteristic value, generating a sixth determining signal, and terminating the voice call according to the sixth deter mining signal.

9. The voice call establishing method according to claim 1, wherein after establishing a second voice call, the method further comprises:

detecting the characteristic value of the distance from the mobile terminal to the target object and the acceleration characteristic value of the mobile terminal; and if the characteristic value of the distance from the mobile terminal to the target object changes from the second distance characteristic value to the first distance characteristic value, and the acceleration characteristic value of the mobile terminal changes from the second characteristic value to the first characteristic value, generating a seventh determining signal, and converting the second voice call into the first voice call according to the seventh determining signal.

10. A voice call establishing apparatus, comprising:

a receiving unit, configured to receive a voice call request, generate an internal trigger signal according to the voice call request, and transmit the internal trigger signal;

a detecting unit, configured to receive the internal trigger signal, detect an acceleration characteristic value of a mobile terminal and/or a characteristic value of a distance from the mobile terminal to a target object within a preset time threshold according to the internal trigger signal, and transmit, to a call establishing unit, the acceleration characteristic value of the mobile terminal and the characteristic value of the distance from the mobile terminal to the target object; and wherein the call establishing unit is configured to:

receive the acceleration characteristic value of the mobile terminal and the characteristic value of the distance from the mobile terminal to the target object; and if an initial value of the acceleration characteristic value of the mobile terminal is a first characteristic value and does not change within the preset time threshold, generate a first determining signal, and according to the first determining signal, receive the voice call request and establish a first voice call, wherein audio information of the first voice call is input or output by using an audio input/output device of a car connected to the mobile terminal; and if the acceleration characteristic value of the mobile terminal changes from the initial first characteristic value to a second characteristic value within the preset time threshold, and the characteristic value of the distance from the mobile terminal to the target object changes from a first distance characteristic value to a second distance characteristic value, generate a second determining signal, and establish a second voice call according to the second determining signal, wherein audio information of the second voice call is input or output by using an audio input/output device of the mobile terminal.

11. The voice call establishing apparatus according to claim 10, further comprising a call ending unit configured to:

receive the acceleration characteristic value of the mobile terminal transmitted by the detecting unit; and if the acceleration characteristic value of the mobile terminal changes from the initial first characteristic value to a third characteristic value within the preset time threshold, generate a third determining signal, and according to the third determining signal, deny the voice call request and terminate a voice call.

12. The voice call establishing apparatus according to claim 11, wherein the call ending unit is further configured to:
   if the initial value of the acceleration characteristic value of the mobile terminal is the third characteristic value and does not change within the preset time threshold, generate the third determining signal, and according to the third determining signal, deny the voice call request and end a voice call.

13. The voice call establishing apparatus according to claim 10, wherein the call establishing unit is further configured to:
   if the initial value of the acceleration characteristic value of the mobile terminal is the third characteristic value and the acceleration characteristic value changes from the initial third characteristic value to the first characteristic value within the preset time threshold, generate the first determining signal, and according to the first determining signal, receive the voice call request and establish the first voice call.

14. The voice call establishing apparatus according to claim 10, wherein the call establishing unit is further configured to: if the initial value of the acceleration characteristic value of the mobile terminal is the third characteristic value and the acceleration characteristic value changes from the initial third characteristic value to the second characteristic value within the preset time threshold, and the characteristic value of the distance from the mobile terminal to the target object changes from the first distance characteristic value to the second distance characteristic value, generate the second determining signal, and establish the second voice call according to the second determining signal.

15. The voice call establishing apparatus according to claim 10, wherein the call ending unit is further configured to:
   receive the acceleration characteristic value that is of the mobile terminal and detected by the detecting unit; and
   if the acceleration characteristic value of the mobile terminal changes from the first characteristic value to the third characteristic value, generate a fourth determining signal, and terminate a voice call according to the fourth determining signal.

16. The voice call establishing apparatus according to claim 10, further comprising a call switching unit is configured to:
   receive the characteristic value of the distance from the mobile terminal to the target object and the acceleration characteristic value of the mobile terminal that are detected by the detecting unit; and if the characteristic value of the distance from the mobile terminal to the target object changes from the first distance characteristic value to the second distance characteristic value, and the acceleration characteristic value of the mobile terminal changes from the first characteristic value to the second characteristic value, generate a fifth determining signal, and convert the first voice call into the second voice call according to the fifth determining signal.

17. The voice call establishing apparatus according to claim 11, wherein the call ending unit is further configured to:
   receive the acceleration characteristic value that is of the mobile terminal and detected by the detecting unit; and
   if the acceleration characteristic value of the mobile terminal changes from the second characteristic value to the third characteristic value, generate a sixth determining signal, and terminate a voice call according to the sixth determining signal.

18. The voice call establishing apparatus according to claim 16, wherein the call switching unit is further configured to:
   receive the characteristic value of the distance from the mobile terminal to the target object and the acceleration characteristic value of the mobile terminal that are detected by the detecting unit; and
   if the characteristic value of the distance from the mobile terminal to the target object changes from the second distance characteristic value to the first distance characteristic value, and the acceleration characteristic value of the mobile terminal changes from the second characteristic value to the first characteristic value, generate a seventh determining signal, and convert the second voice call into the first voice call according to the seventh determining signal.

19. A voice call establishing apparatus, comprising:
   a receiving unit, configured to receive a voice call request, generate an internal trigger signal according to the voice call request, and transmit the internal trigger signal to a detecting unit;
   wherein the detecting unit is configured to detect an acceleration characteristic value of a mobile terminal and/or a characteristic value of a distance from the mobile terminal to a target object within a preset time threshold according to the internal trigger signal, and transmit, to a call establishing unit, the acceleration characteristic value of the mobile terminal and the characteristic value of the distance from the mobile terminal to the target object; and
   wherein the call establishing unit is configured to:
      receive the acceleration characteristic value of the mobile terminal and the characteristic value of the distance from the mobile terminal to the target object; and
      if an initial value of the acceleration characteristic value of the mobile terminal is a third characteristic value and the acceleration characteristic value changes from the initial third characteristic value to a first characteristic value within the preset time threshold, generate the first determining signal, and according to a first determining signal, receive the voice call request and establish a first voice call, wherein audio information of the first voice call is input or output by using an audio input/output device of a car connected to the mobile terminal; and
      if the acceleration characteristic value of the mobile terminal changes from the third characteristic value to a second characteristic value within the preset time threshold, and the characteristic value of the distance from the mobile terminal to the target object changes from a first distance characteristic value to a second distance characteristic value, generate a second determining signal, and establish a second voice call according to a second determining signal, wherein audio information of the second voice call is input or output by using an audio input/output device of the mobile terminal.

20. The voice call establishing apparatus according to claim 19, further comprising a call ending unit configured to:
   if the initial value of the acceleration characteristic value of the mobile terminal is the third characteristic value and does not change within the preset time threshold, generate the third determining signal, and according to the third determining signal, deny the voice call request and end a voice call.

\* \* \* \* \*